CONSTANT AMPLITUDE GENERATOR

Filed Dec. 30, 1957 2 Sheets-Sheet 1

INVENTOR
MARTIN FISCHMAN
BY Theodore Jay Jr.
ATTORNEY

INVENTOR
MARTIN FISCHMAN
BY [signature]
ATTORNEY

United States Patent Office 2,956,235

Patented Oct. 11, 1960

2,956,235

CONSTANT AMPLITUDE GENERATOR

Martin Fischman, Wantagh, N.Y., assignor, by mesne assignments, to Sylvania Electric Products Inc., Wilmington, Del., a corporation of Delaware Filed Dec. 30, 1957, Ser. No. 706,108

2 Claims. (Cl. 330—85)

This invention relates to a control circuit.

In the electronic amplifier art, there are various applications where the output of a pulse signal amplifier must be maintained at a constant voltage, current or power level. In such applications it is often important that the amplifier circuit be capable of automatically correcting for wide changes in operating conditions in order to maintain the output level constant.

A typical example of such application is the scanning circuit of a color television receiver of the Beam Index Sequential type. In the reproduction of information on a color television picture tube, the tube face is illuminated by the action of a scanning electron beam. The beam normally travels horizontally across the tube face, producing various colors as it strikes the various color phosphor areas disposed thereon. The beam is caused to scan the face by means of a yoke or winding disposed about the neck of the tube through which a sawtooth current is passed. This current is derived from the scanning circuit of the receiver.

The width of the picture produced on the tube face is determined largely by the amplitude of the sawtooth pulse. When using the Beam Index Sequential color television system, small variations in width will cause faulty color registration, i.e. the beam in the color tube will strike, for example, a blue phosphor area instead of a red one. It is obvious, therefore, that the current pulses supplied by the sawtooth amplifier must be held at a given value. To my knowledge, the sawtooth amplifiers in the prior art are not capable of maintaining the sawtooth current amplitude at a given level when there are wide variations in operating conditions, for example, fluctuating supply voltages.

Accordingly, it is an object of this invention to devise an amplifier or generator having a constant, unvarying output amplitude.

It is another object of this invention to control the current, voltage or power amplitude at the output of an amplifier or generator in such a way that a constant amplitude will result despite wide variations in operating conditions of the amplifier.

It is a further object of this invention to device an amplifier or generator capable of automatically correcting for wide changes in operating conditions to thus maintain its output amplitude constant.

These and other objects of the invention will either be explained or will become apparent to those skilled in the art when this specification is studied in conjunction with the accompanying drawings wherein.

In accordance with the principles of my invention, I provide a constant current generator including a variable gain amplifier having an input and an output circuit, a negative feedback loop coupled at its input to the output circuit of the amplifier and coupled at its output to the input circuit of the amplifier, and a load coupled to the output circuit of the amplifier. A unidirectional signal, which attains predetermined amplitudes at predetermined intervals of time, is supplied to the input of the amplifier and appears as a pulse signal in the output circuit. A control input signal proportional to the amplifier output signal amplitude is developed in the input circuit of the feedback loop.

More particularly, the feedback loop is conditionally responsive to changes in the amplitude of the output signal. The control input signal is compared with a fixed voltage in the input circuit of the feedback loop and renders the normally non-conductive loop conductive only during the intervals when the control input signal attains a predetermined threshold amplitude. During these intervals, a control output signal is developed in the output of the feedback loop. This signal is further modified to produce a variable control voltage which is applied to the input of the amplifier. The gain of the amplifier is varied in accordance with the amplitude of this control voltage in such manner that the amplitude of the amplifier output signal remains constant. Any type of electron discharge device having at least one input and one output electrode, for example, a triode, may be employed as the amplifier.

There may be applications, however, requiring greater gain or more sensitive grid cutoff control than may be conveniently obtained with a triode. In such cases, a tetrode, or a pentode, for example, may be employed. The greater gain of such devices may, however, result in instability of operation known as "hunting." The invention, therefore, contemplates the utilization of a conditionally responsive negative feedback loop from a first output circuit of the amplifier to its input circuit, as above, and in addition a second negative feedback loop from a second output circuit to its input circuit, the second loop restoring stability of operation to the circuit.

Figure 1:
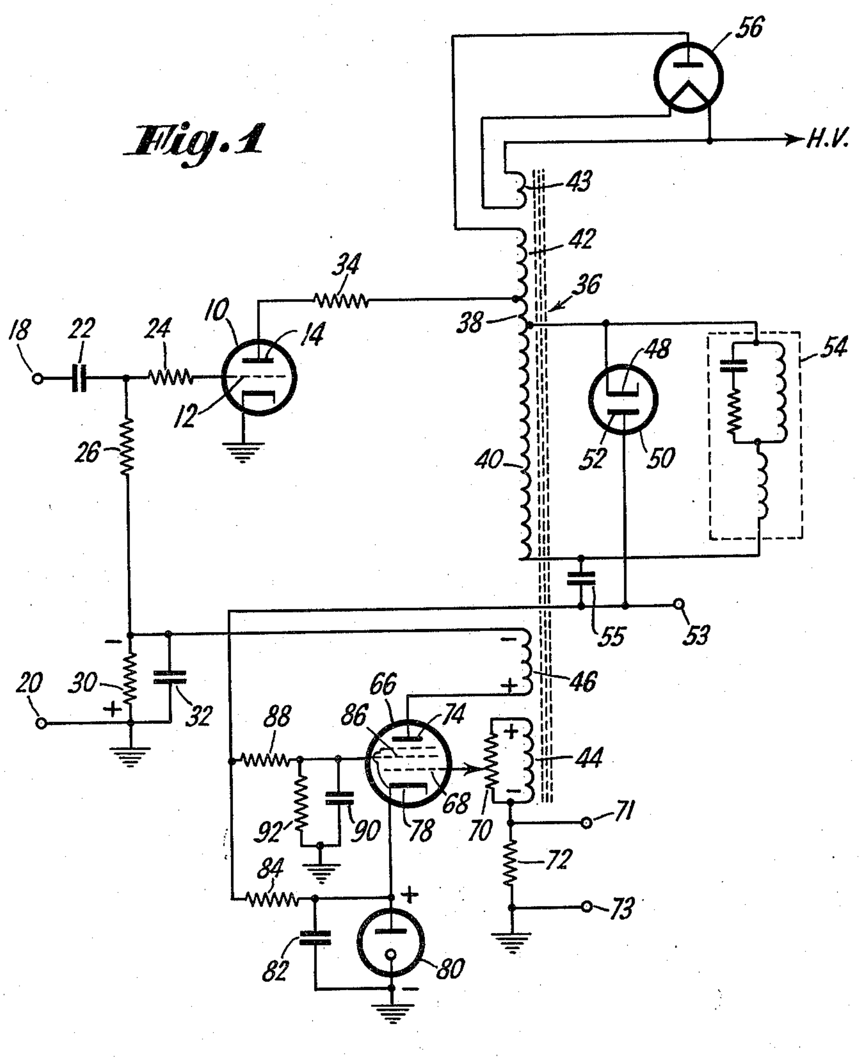
Fig. 1 is a circuit diagram of the invention.

Referring now to Fig. 1, there is provided a generator of sawtooth current pulses, including a variable gain amplifier tube 10 which may be a triode, and its various circuit components. The amplifier tube is provided with an input circuit connected to a control grid 12 and an output circuit connected to an anode 14. For simplicity and convenience, terminals 18 and 20 are shown as the points at which an input signal having predetermined amplitudes at predetermined intervals of time is applied from a prior circuit stage. This signal is applied to the grid 12 through a coupling capacitor 22 and a resistor 24.

Connected also in the input circuit are resistors 26 and 30 in series, the resistor 30 being connected in parallel with a capacitor 32, which together act as a filter network to smooth out control signal pulses applied thereto from a control circuit to be described.

The anode 14 is connected through a resistor 34 to a transformer 36. The transformer preferably has six electromagnetically coupled windings 38, 40, 42, 43, 44 and 46. The windings 38, 40 and 42 are connected in series. Winding 38 is connected in series with the resistor 34 and also with the cathode 48 to a suitable diode damper tube 50. The anode 52 of the damper is connected to a point 53 of positive potential. A load comprising a horizontal deflection yoke or winding 54, is disposed about the neck of a television picture tube, not shown, and is connected directly across the winding 40 of the transformer 36 to provide scanning power thereto. The lower end of this winding is connected to a capacitor 55, the other end of the capacitor being connected to the point 53 of positive potential.

The windings 42 and 43 are provided in conjunction with a half wave diode rectifier 56 as a convenient source of high potential supply for the anode of the cathode ray tube.

There is also provided a control circuit comprising a control tube 66, for example a pentode, such as a type 6AU6, and its associated circuit components. The signal input to this circuit is applied between the control grid and cathode. The control grid 68 is connected to the movable contact of a potentiometer 70 which is connected across the winding 44 of the transformer 36. The lower end of this winding is connected to chassis ground through a resistor 72, the ends of which are connected to input terminals 71 and 73 for a purpose to be described later. The plate 74 of the control tube is connected to resistor 30 and capacitor 32 through the winding 46 of the transformer 36.

The cathode 78 of the control tube is connected to chassis ground through a suitable voltage regulator tube 80, the latter being connected in parallel with a suitable capacitor 82. By means of its connection to the point 53 of positive potential through resistor 84, a potential of 105 volts is maintained across the regulator tube; thus the tube acts as a standard voltage source.

The screen grid 86 of the control tube is connected to the point 53 of positive potential through a resistor 88. A bypass capacitor 90 is connected to the screen grid. An additional resistor 92 is also provided, which together with the resistor 88 acts as a voltage divider. The purpose of this arrangement is to cause the screen voltage to be almost entirely independent of any change due to variations of screen current as the control tube is pulsed.

The control circuit just described, including the transformer 36 coupled to its input circuit and the filter network 30, 32 coupled to its output circuit, comprises a negative feedback loop and is conditionally responsive to changes in amplitudes of the amplifier output signal, as will be seen from the description of operation.

The circuit operates in the following manner. Assume a signal having predetermined amplitudes at predetermined intervals of time, for example a sawtooth voltage, to be applied to the input terminals 18 and 20. The generator comprising the tube 10 and its associated components then generates a sawtooth current which, when applied to the yoke 54, will scan the cathode ray tube, not shown, in a horizontal direction. So long as there are no changes in applied voltages or other factors affecting the value of current output from the generator, the sawtooth current pulses will be maintained at a steady amplitude, which is the desired condition.

Under these circumstances, the conditionally responsive negative feedback loop will be conductive. More particularly, with reference to Fig. 3, the sawtooth pulses in winding 38 will produce control input signal pulses $V_1$ across winding 44.

The winding 44 is so arranged that the end connected to resistor 72 will be negative, the other end, connected to the grid 68, being positive with respect thereto. Thus connected, the pulse voltage $V_1$ will be compared with the standard reference voltage $V_2$ across the regulator tube 80. Since these voltages oppose each other, the difference voltage will appear on the grid 68 of the control tube 66. The reference voltage $V_2$ is fixed at 105 volts, maintaining the control tube 66 at cutoff whenever the pulse voltage $V_1$ across the winding 44 is below the threshold value, i.e., when it is insufficient to overcome the cutoff condition.

Figure 3:
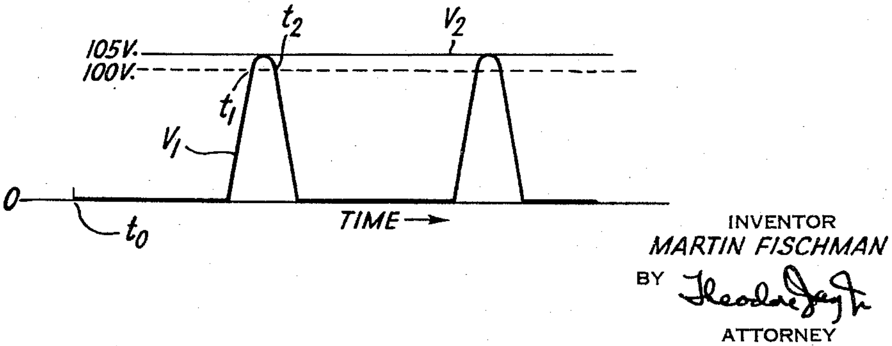
Fig. 3 represents a signal wave form helpful in understanding the operation of the circuit.

With the arm of the potentiometer in its topmost position and using a control tube having a minus 5 volt cutoff, it will be seen with reference to Fig. 3 that from time $t_0$ to $t_1$, the value of the pulse voltage $V_1$ will be insufficient to overcome the cutoff condition produced by $V_2$ across the regulator tube 80. However, at time $t_1$, current will begin to flow in the control tube 66 and will continue until time $t_2$ when $V_1$ drops below 100 volts.

The anode supply voltage for the control tube is provided by positive pulses of approximately 300 volts induced in winding 46 of the transformer. This voltage has a pulse waveform and is in phase with the pulses applied to the grid circuit by the winding 44.

The winding 46 is so arranged that the end connected to the anode 74 is positive whenever a voltage pulse appears across the winding. Thus connected, control output pulses will be produced in the anode circuit of the control tube which will produce a signal of positive polarity at the end of the resistor 30 that is connected to chassis ground, and negative at its other end. The pulses so produced are filtered by the network comprising the capacitor 32 and the resistor 30, to produce a relatively smooth but variable voltage across this resistor for controlling the bias on and therefore the gain of, amplifier tube 10.

Considering now a change in circuit conditions, for example an increase in the anode supply potential, it is obvious that the output signal pulse of tube 10 will tend to increase in amplitude. In the absence of the conditionally responsive negative feedback loop, this condition would increase the width of the picture on the television picture tube since the current through the yoke 54 would be greater. The compensating action of the loop, however, prevents this.

More particularly, an increase in the amplitude of the output from tube 10 will increase the voltage pulses $V_1$ induced across the winding 44. The peak value of this voltage will now be greater, causing a less negative signal to be impressed on the grid 68, thus increasing the output signal amplitude of the control tube 66. This increased amplitude will increase the negative bias on the amplifier tube, reducing its amplification, thereby returning the output current amplitude to the value it had before the increase in anode supply potential. The response of the negative feedback loop is rapid, so that no increase in picture width or faulty color registration is discernible on the picture tube.

The circuit works equally well in the opposite direction; i.e. a decrease in the anode supply potential would result in a smaller sawtooth current pulse in the output of the amplifier, but the control tube would decrease the negative bias on tube 10, thus increasing its gain and restoring the pulse to its normal size. The over-all effect, therefore, is a stabilization of the output level of the sawtooth pulse current generator, regardless of variations in operating conditions, such as, for example, wide changes in anode supply potential. The sawtooth current amplitude delivered by the amplifier may be controlled by setting the level of the potentiometer 70.

Figure 2:
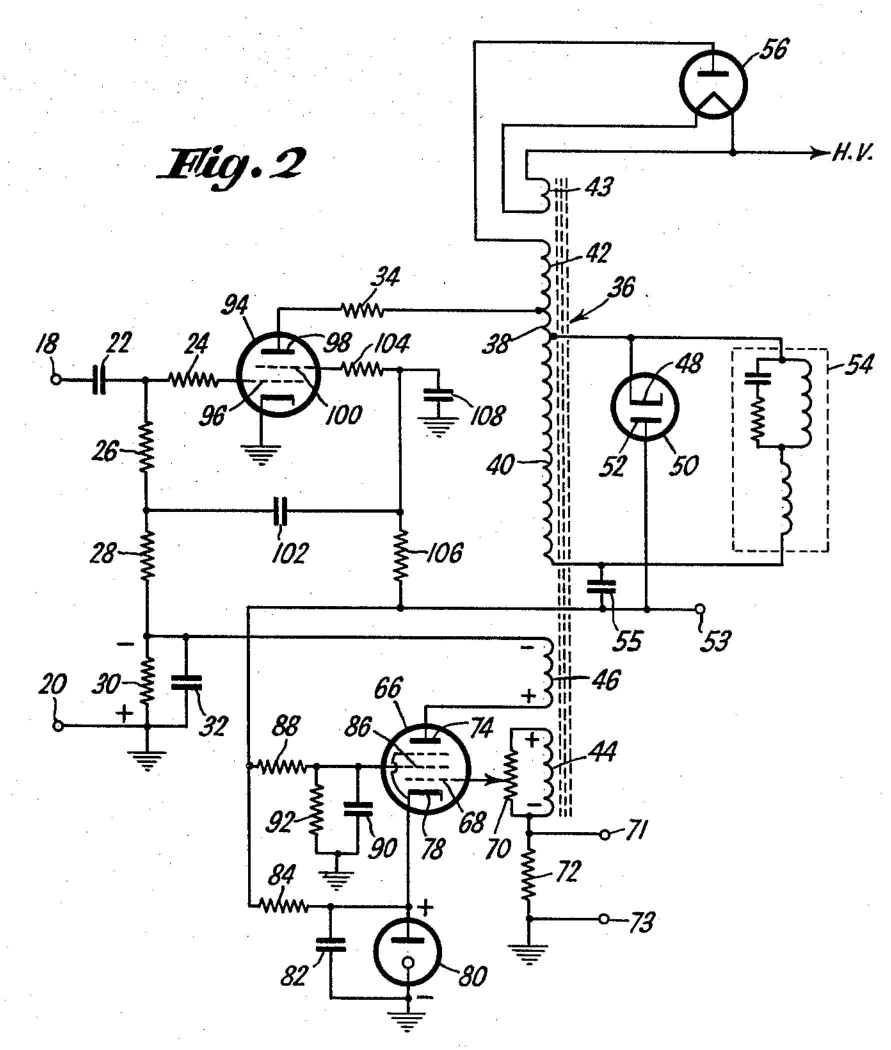
Fig. 2 is an alternative embodiment of the invention.

Referring now to Fig. 2, it will be seen that the circuit is very similar to that of Fig. 1, but the triode 10 in that figure has been replaced by a tetrode 94, for example a type 6BQ6, having an input circuit connected to a first grid 96, a first output circuit connected to an anode 98 and a second output circuit connected to a screen grid 100.

The components in the input circuit and also in the first output circuit are except for resistor 28, the same as those in Fig. 1. Thus, a first negative feedback loop, comprising the transformer 36, the control tube circuit and the filter network, couples the first output circuit of the generator to its input circuit.

There is provided in this circuit, however, a second negative feedback loop between the screen grid 100 and the control grid 96, which couples the second output circuit of the generator to its input circuit. The principal component of this second loop is the coupling capacitor 102. This capacitor is connected at one end to the generator input circuit at the junction of resistors 26 and 28, its other end being connected to the junction of resistors 104 and 106. The latter two resistors connect the screen grid 100 with the point 53 of positive potential. A screen bypass capacitor 108 is also connected to the junction of resistors 104 and 106. The resistor- 26 serves to prevent attenuation of the sawtooth voltage applied to the input of the amplifier. Resistor 28 isolates the feedback signal supplied through capacitor 102 from the filter network 30, 32.

The operation of the first negative feedback loop in Fig. 2 is the same as that of the feedback loop in Fig. 1 described above. The circuit of Fig. 2, however, is preferable in that the tetrode tube is capable of greater gain and therefore this circuit can produce a constant level pulse output for wider variations in operating conditions than can the circuit of Fig. 1, in which a triode is employed. Because of the greater gain of the tetrode circuit, however, the operation of this circuit will sometimes be attended with "hunting," the sawtooth output pulses then varying widely in amplitude.

In order to remedy this difficulty, I have provided the second negative feedback loop including the capacitor 102 described above.

The optimum value of this capacitor will vary, depending upon the anode and screen supply potentials, circuit components and other factors. In the circuit of Fig. 2, employing the recommended value for the anode and screen potentials for a 6BQ6, I have found that a value of 6800 micro-microfarad supplies enough feedback to eliminate the hunting effect and stabilize the sawtooth output amplitude of the generator. With this circuit, I have also been able to vary the positive potential at point 53 from approximately 150–450 volts with no perceptible change in the amplitude of the output pulse across the load 54.

It sometimes becomes desirable to modulate the constant level current pulses generated in accordance with a certain frequency, for example, when conducting experiments in a laboratory. As a convenient means of accomplishing this, the terminals 71 and 73 are provided to receive a signal of suitable frequency and waveform. This signal will modify the flow of current in the control tube, thus also modifying the value of the current developed by the current generator.

While I have shown and pointed out my invention as applied above, it will be apparent to those skilled in the art that many modifications can be made within the scope and sphere of my invention as defined in the claims which follow.

What is claimed is:

1. A constant amplitude generator comprising an amplifier having an input circuit and an output circuit; a transformer having first, second, third and fourth electromagnetically coupled windings, one end of said first winding being coupled to the output circuit of said amplifier and the other end of said first winding being coupled to a source of positive voltage; means for coupling said second winding to a load; an electron discharge device having a cathode, an anode, and a control grid; a source of reference voltage connected between said cathode and a common voltage reference point; means coupling said third winding between said control grid and said common voltage reference point, the polarity of the voltage between said cathode and said common voltage reference point being the same as the polarity of the voltage between said control grid and said common voltage reference point; a filter network coupled between the input circuit of said amplifier and said common voltage reference point; and means coupling said fourth winding between the anode of said electron discharge device and the input circuit of said amplifier.

2. A constant amplitude generator as defined in claim 1 further comprising impedance means coupled between the output and input of said amplifier, said impedance means providing a negative feedback path around said amplifier.

References Cited in the file of this patent

UNITED STATES PATENTS

| | | |
|---|---|---|
| 2,262,865 | Shrader | Nov. 18, 1941 |
| 2,644,083 | Bell | Junes 30, 1953 |
| 2,719,191 | Hermes | Sept. 27, 1955 |
| 2,758,205 | Lubkin | Aug. 7, 1956 |
| 2,766,331 | Birkemeier | Oct. 9, 1956 |
| 2,782,362 | Lewis | Feb. 19, 1957 |
| 2,799,777 | Kochevar | July 16, 1957 |
| 2,836,713 | Scott et al. | May 27, 1958 |